US010257483B2

(12) United States Patent
Liu et al.

(10) Patent No.: US 10,257,483 B2
(45) Date of Patent: Apr. 9, 2019

(54) COLOR GAMUT MAPPER FOR DYNAMIC RANGE CONVERSION AND METHODS FOR USE THEREWITH

(71) Applicant: ViXS Systems, Inc., Toronto (CA)

(72) Inventors: Ying Liu, Waterloo (CA); Xinghai Li, North York (CA); Jie Feng, Scarborough (CA)

(73) Assignee: VIXS SYSTEMS, INC., Toronto (CA)

( * ) Notice: Subject to any disclaimer, the term of this patent is extended or adjusted under 35 U.S.C. 154(b) by 0 days.

(21) Appl. No.: 15/858,096

(22) Filed: Dec. 29, 2017

(65) Prior Publication Data

US 2018/0124368 A1 May 3, 2018

Related U.S. Application Data

(63) Continuation of application No. 14/953,765, filed on Nov. 30, 2015, now Pat. No. 9,860,504, which is a continuation-in-part of application No. 14/863,065, filed on Sep. 23, 2015, now Pat. No. 9,544,560.

(60) Provisional application No. 62/101,947, filed on Jan. 9, 2015.

(51) Int. Cl.

| | |
|---|---|
| ***H04N 9/68*** | (2006.01) |
| ***H04N 5/20*** | (2006.01) |
| ***H04N 9/67*** | (2006.01) |
| ***G06T 5/00*** | (2006.01) |

(52) U.S. Cl.

CPC .............. *H04N 9/68* (2013.01); *G06T 5/009* (2013.01); *H04N 5/20* (2013.01); *H04N 9/67* (2013.01); *G06T 2207/10016* (2013.01); *G06T 2207/20208* (2013.01)

(58) Field of Classification Search

None

See application file for complete search history.

(56) References Cited

U.S. PATENT DOCUMENTS

| | | | |
|---|---|---|---|
| 5,387,896 | A | 2/1995 | Alappat et al. |
| 6,181,445 | B1 | 1/2001 | Lin et al. |
| 7,433,514 | B2 | 10/2008 | Sloan |
| 7,636,496 | B2 | 12/2009 | Duan et al. |
| 7,755,526 | B2 | 7/2010 | Medina et al. |
| 7,783,121 | B1 | 8/2010 | Cox |
| 8,014,027 | B1 | 9/2011 | Kulkarni et al. |
| 8,248,486 | B1 | 8/2012 | Ward et al. |
| 8,537,177 | B2 | 9/2013 | Bhaskaran et al. |
| 8,593,480 | B1 | 11/2013 | Ballestad et al. |
| 8,666,186 | B1 | 3/2014 | Rasche |
| 8,760,578 | B2 | 6/2014 | Li |
| 8,922,720 | B1 | 12/2014 | Gish et al. |
| 9,025,867 | B2 | 5/2015 | Cote et al. |
| 9,076,224 | B1 | 7/2015 | Shah et al. |
| 9,100,660 | B2 | 8/2015 | Su et al. |

(Continued)

*Primary Examiner* — Nicholas R Wilson

(74) *Attorney, Agent, or Firm* — Miller Nash Graham & Dunn LLP

(57) ABSTRACT

In various embodiments, a color gamut mapper includes a gamut map selection generator configured to analyze color space signals and generate a gamut map selection signal in response thereto. A color gamut transformer is configured to process the color space signals via a selected one of a plurality of gamut maps to generate gamut mapped color space signals, wherein the selected one of the plurality of gamut maps is selected in response to the gamut map selection signal. Other embodiments are disclosed.

20 Claims, 11 Drawing Sheets

DCTM 202 & CD 206
C/S sigs. 330
Color volume transformer 215
Rgs. 450 Gamut shaper 320
Rgs. 452 Tone mapper 322
Rgs. 454 Color remapper 324
Rgs. 456 Tone mapper 326
Rgs. 458 CSC 328
Xfrm C/S sigs. 332
Color volume transform path 360
Pixel clock and frame clock generator 362

(56) References Cited

U.S. PATENT DOCUMENTS 9,100,662 B2 8/2015 Puri et al.
9,219,898 B2 12/2015 Doser
9,338,389 B2 5/2016 Messmer
2005/0219576 A1 10/2005 Eun
2007/0014470 A1 1/2007 Sloan
2007/0223813 A1 9/2007 Segall et al.
2008/0137976 A1 6/2008 Ward
2008/0266459 A1 10/2008 Butterworth
2009/0027558 A1 1/2009 Mantiuk et al.
2009/0041376 A1 2/2009 Carletta et al.
2009/0066790 A1 3/2009 Hammadou
2009/0231646 A1 9/2009 Yamauchi et al.
2009/0262798 A1 10/2009 Chiu et al.
2009/0290807 A1 11/2009 Marchesotti
2009/0317017 A1 12/2009 Au et al.
2010/0074553 A1 3/2010 Choi et al.
2010/0135634 A1 6/2010 Ito et al.
2010/0161757 A1 6/2010 Suh et al.
2010/0164976 A1 7/2010 Choe et al.
2010/0166301 A1 7/2010 Jeon
2010/0177203 A1 7/2010 Lin
2010/0180007 A1 7/2010 Suh et al.
2010/0185746 A1 7/2010 Suh et al.
2010/0186035 A1 7/2010 Song et al.
2010/0186058 A1 7/2010 Suh et al.
2010/0186059 A1 7/2010 Suh
2010/0220237 A1 9/2010 Doser et al.
2011/0099579 A1 4/2011 Kim et al.
2011/0128438 A1 6/2011 Yamashita et al.
2011/0134332 A1 6/2011 Jaynes et al.
2011/0141347 A1 6/2011 Suh et al.
2011/0194618 A1 8/2011 Gish et al.
2011/0243473 A1 10/2011 Chen et al.
2011/0305391 A1 12/2011 Kunkel et al.
2011/0316973 A1 12/2011 Miller
2012/0076407 A1 3/2012 Zhou
2012/0182209 A1* 7/2012 Tuikkanen ............ G09G 3/342
345/99
2012/0218442 A1 8/2012 Jandhyala et al.
2012/0229495 A1 9/2012 Longhurst
2012/0281009 A1 11/2012 Ward
2013/0038790 A1 2/2013 Seetzen
2013/0064462 A1 3/2013 Ninan et al.
2013/0083855 A1 4/2013 Kottke
2013/0114000 A1 5/2013 Atkins
2013/0120656 A1 5/2013 Wilson et al.
2013/0127894 A1 5/2013 Cox
2013/0129239 A1 5/2013 Fukuhara et al.
2013/0294689 A1 11/2013 Jia et al.
2013/0314495 A1 11/2013 Chen et al.
2013/0328907 A1 12/2013 Ballestad et al.
2013/0335438 A1 12/2013 Ward
2013/0341264 A1 12/2013 Yim
2013/0342649 A1 12/2013 Yim et al.
2014/0022460 A1 1/2014 Li et al.
2014/0028700 A1 1/2014 Park et al.
2014/0092116 A1 4/2014 Ofili et al.
2014/0096173 A1 4/2014 Song et al.
2014/0152686 A1 6/2014 Narasimha et al.
2014/0226076 A1 8/2014 Kim et al.
2014/0340434 A1 11/2014 El-Ghoroury et al.
2015/0007243 A1 1/2015 Kunkel et al.
2015/0030234 A1 1/2015 Lenseigne et al.
2015/0066923 A1 3/2015 Ali et al.
2015/0179135 A1 6/2015 Stauder et al.
2015/0221280 A1 8/2015 Van Der Vleuten
2015/0243243 A1 8/2015 Greenebaum et al.
2015/0248747 A1 9/2015 Atkins
2015/0256860 A1 9/2015 Kunkel et al.
2015/0302562 A1 10/2015 Zhai et al.
2015/0358646 A1 12/2015 Mertens
2016/0005153 A1 1/2016 Atkins et al.
2016/0104438 A1 4/2016 Han et al.
2016/0125581 A1 5/2016 Ward
2016/0127736 A1 5/2016 Touze et al.
2016/0134853 A1 5/2016 Gish et al.
2016/0155245 A1 6/2016 Stauder et al.
2016/0163356 A1 6/2016 De Haan et al.
2016/0165256 A1 6/2016 Van Der Vleuten et al.
2016/0203618 A1 7/2016 Li et al.
2016/0205367 A1 7/2016 Wallace
2016/0205368 A1 7/2016 Wallace et al.
2016/0205369 A1 7/2016 Wallace
2016/0205370 A1 7/2016 Wallace
2016/0205371 A1 7/2016 Wallace et al.
2016/0205372 A1 7/2016 Liu et al.

* cited by examiner 125
40
50
70
30

10
60
80
20

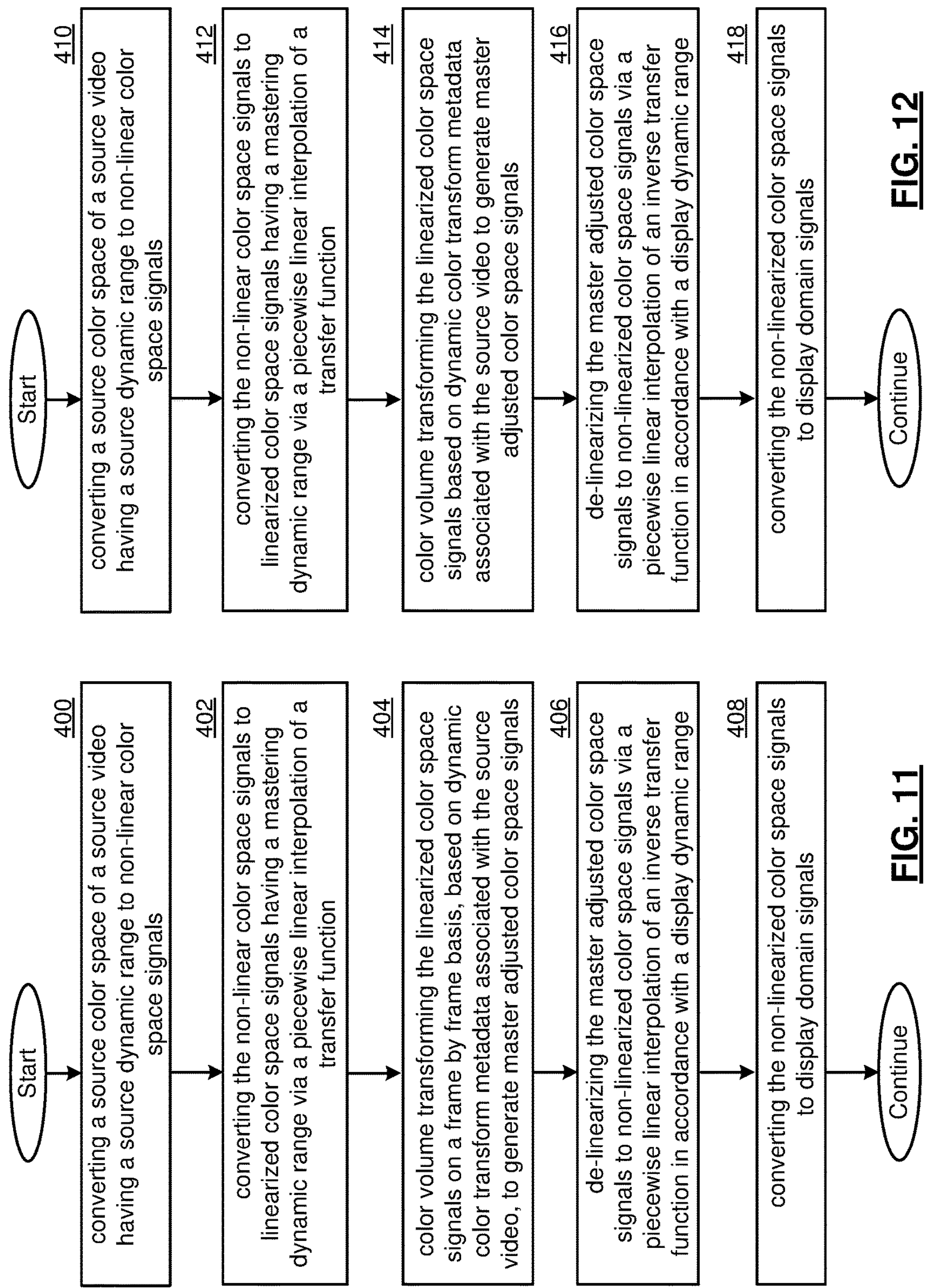
Start
400
converting a source color space of a source video having a source dynamic range to non-linear color space signals
402
converting the non-linear color space signals to linearized color space signals having a mastering dynamic range via a piecewise linear interpolation of a transfer function
404
color volume transforming the linearized color space signals on a frame by frame basis, based on dynamic color transform metadata associated with the source video, to generate master adjusted color space signals
406
de-linearizing the master adjusted color space signals to non-linearized color space signals via a piecewise linear interpolation of an inverse transfer function in accordance with a display dynamic range
408
converting the non-linearized color space signals to display domain signals
Continue
FIG. 11
Start
410
converting a source color space of a source video having a source dynamic range to non-linear color space signals
412
converting the non-linear color space signals to linearized color space signals having a mastering dynamic range via a piecewise linear interpolation of a transfer function
414
color volume transforming the linearized color space signals based on dynamic color transform metadata associated with the source video to generate master adjusted color space signals
416
de-linearizing the master adjusted color space signals to non-linearized color space signals via a piecewise linear interpolation of an inverse transfer function in accordance with a display dynamic range
418
converting the non-linearized color space signals to display domain signals
Continue
FIG. 12

COLOR GAMUT MAPPER FOR DYNAMIC RANGE CONVERSION AND METHODS FOR USE THEREWITH

CROSS REFERENCE TO RELATED APPLICATIONS

This application is a continuation of U.S. patent application Ser. No. 14/953,765 filed on Nov. 30, 2015, which is a continuation-in-part of U.S. patent application Ser. No. 14/863,065, entitled "DYNAMIC RANGE CONVERTER WITH GENERIC ARCHITECTURE AND METHODS FOR USE THEREWITH", filed Sep. 23, 2015, now U.S. Pat. No. 9,544,560, issued Jan. 10, 2017, which claims priority U.S. Provisional Application No. 62/101,947, entitled "HDR-SDR COLOR SPACE CONVERSION", filed Jan. 9, 2015, which are hereby incorporated herein by reference in their entirety.

TECHNICAL FIELD

The present disclosure relates to audio/video systems that process and present audio and/or display video signals.

DESCRIPTION OF RELATED ART

Modern users have many options to view audio/video programming. Home media systems can include a television, a home theater audio system, a set top box and digital audio and/or A/V player. The user typically is provided one or more remote control devices that respond to direct user interactions such as buttons, keys or a touch screen to control the functions and features of the device. Audio/video content is also available via a personal computer, smartphone or other device. Such devices are typically controlled via buttons, keys, a mouse or other pointing device or a touch screen.

Video encoding has become an important issue for modern video processing devices. Robust encoding algorithms allow video signals to be transmitted with reduced bandwidth and stored in less memory. However, the accuracy of these encoding methods face the scrutiny of users that are becoming accustomed to greater resolution and higher picture quality. Standards have been promulgated for many encoding methods including the H.264 standard that is also referred to as MPEG-4, part 10 or Advanced Video Coding, (AVC). While this standard sets forth many powerful techniques, further improvements are possible to improve the performance and speed of implementation of such methods. Further, encoding algorithms have been developed primarily to address particular issues associated with broadcast video and video program distribution.

BRIEF DESCRIPTION OF THE SEVERAL VIEWS OF THE DRAWINGS

FIG. 11 presents a flowchart representation of a method in accordance with an embodiment of the present disclosure.

FIG. 12 presents a flowchart representation of a method in accordance with an embodiment of the present disclosure.

DETAILED DESCRIPTION

Figure 1:
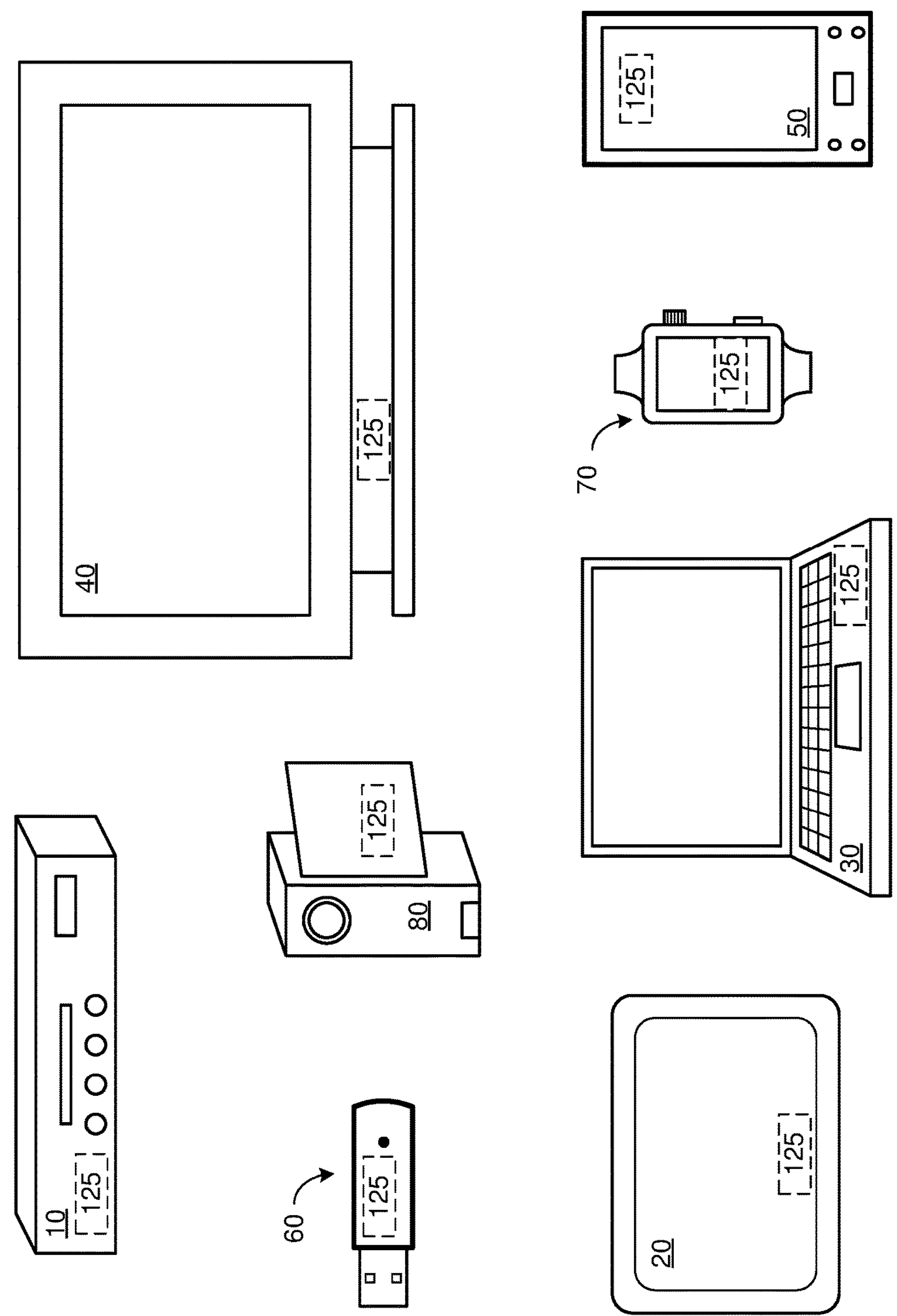
FIG. 1 presents pictorial diagram representations of various video devices in accordance with embodiments of the present disclosure.

FIG. 1 presents pictorial diagram representations of various video devices in accordance with embodiments of the present disclosure. In particular, device 10 represents a set top box with or without built-in digital video recorder functionality or a stand-alone digital video player such as an internet video player, Blu-ray player, digital video disc (DVD) player or other video player. Device 20 represents an Internet tablet. Device 30 represents a laptop, netbook or other personal computer. Device 40 represents a video display device such as a television or monitor. Device 50 represents a smartphone, phablet or other mobile communication device. Device 60 represents a streaming video player. Device 70 represents a smart watch or other wearable computing device with video processing or display functionality. Device 80 represents a handheld video camera.

The devices 10, 20, 30, 40, 50, 60, 70 and 80 each represent examples of electronic devices that incorporate one or more elements of a system 125 that includes features or functions of the present disclosure. While these particular devices are illustrated, system 125 includes any device or combination of devices that is capable of performing one or more of the functions and features described in conjunction with FIGS. 2-13 and the appended claims.

Figure 2:
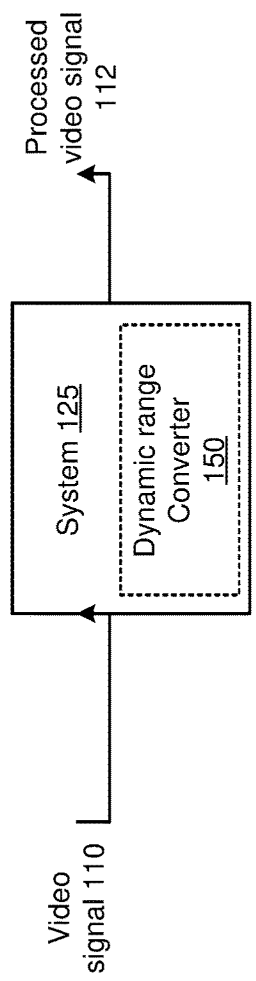
FIG. 2 presents a block diagram representation of a system in accordance with an embodiment of the present disclosure.

FIG. 2 presents a block diagram representation of a system in accordance with an embodiment of the present disclosure. In an embodiment, system 125 receives a video signal 110 and generates a processed video signal 112 via encoding into a digital coding or compression format, decoding from a digital coding or compression format, transcoding from one digital coding and compression format to another digital coding or compression format, etc. The following terms are used:

Luminance: Luminous intensity of a surface in a given direction divided by the projected area of the surface element as viewed from that direction. The units of luminance are candela per square meter (cd/m2). The term luminance as used herein should not to be confused with the term luminance used in television and video to represent a quantity which may more precisely be referred to as "luma".

Dynamic Range: Ratio of largest to smallest luminance

High Dynamic Range (HDR): A term used to describe an image or imaging device that spans or is capable of spanning a range of luminance levels greater than the range of luminance levels spanned by traditional imaging systems. Current standards assume a peak luminance level limited to 10,000 cd/$m^2$.

Standard Dynamic Range (SDR): Peak luminance level commonly defined to be 100 cd/$m^2$ HDR metadata: Parameters transmitted to define the HDR conversion process Electro-Optical Transfer Function (EOTF): Relationship between the nonlinear color values provided to a display device and the linear color values produced by the device.

Inverse Electro-Optical Transfer Function (IEOTF): Function that is inverse of EOTF.

Perceptual Quantizer (PQ): A quantization method taking advantage of the nonlinear response of the human visual system to reduce the number of digital bits to represent an optical signal.

Color value: A number corresponding to the amount of a specific color component (such as R, G, B, or Y) for an image element. Note that prime designations (such as R', G' and B') represent nonlinear color components and non-primed designations (such as R, G and B) represent linear image elements.

Digital code value: Digital representation of an image signal value. Usually representative of a nonlinear color value.

Linear color value: Color Value abbreviated as L, normalized to the range [0,1], that is directly proportional to the optical output of a display device, and which is not directly proportional to the encoded signal representation.

Color volume: Solid in colorimetric space containing all possible colors a display can produce; defined by the color primaries, white point, and luminance range.

Display primaries: Colors of a display from which all other colors of such display are formed through additive combinations.

Maximum display master luminance: The nominal maximum display luminance of the mastering display, represented in candelas per square meter (cd/m^2).

Color Space Converter (CSC): A device that operates via a matrix operation to convert from one color space to another.

Tone mapping: The process of mapping one set of colors to another.

Society of Motion Picture and Television Engineers (SMPTE): An organization that promulgates several standards relating to video processing.

Many modern imaging sensors are capable of delivering linear video signals having dynamic range up to 100 dB, or around 16-bits. This is similar to the dynamic range of the human visual system, which is about 10000:1. Until recently, display panels such as televisions and video monitors were only capable of dynamic range around 100:1. With the advent of higher dynamic range panels, the limitation became the low dynamic range signals supported on the digital interface to the display panels. This precipitated the need for a new quantization device that would squeeze the high dynamic range signal into fewer bits (8, 10, or 12-bits), taking advantage of the nonlinear response of the human visual system. Such a Perceptual Quantizer is discussed in conjunction with SMPTE ST 2084 that presents a standardized transfer function that allows high dynamic range signals to be quantized and coded.

In addition, the SMPTE ST 2086 standard specifies the metadata items to define the color volume (the color primaries, white point, and luminance range) of the display that was used in mastering the video content. This information could be send with an image or scene to inform a consumer display of the characteristics of the mastering display in order to tune itself to recreate the mastering artist's intent originally achieved in the mastering suite. Since ST 2086 is not about dynamic range conversion, this standard does not provide enough information to the consumer display to allow the artist to define how HDR to SDR is to be down converted.

SMPTE ST 2094 addresses the issue of different display devices. In particular, when content mastered with High Dynamic Range (HDR) is transformed for presentation on a display having a smaller color volume, such as Standard Dynamic Range (SDR) display, the color transformation process can be optimized through the use of content-dependent, dynamic color transform metadata rather than using only display color volume metadata (as in ST 2086). Different models of color volume transforms with associated metadata sets may require different processing algorithms and hardware to display the image properly. In ST 2094, provisions are included to support different models, which are called applications and detailed in ST 2094-10 (contribution from Dolby), ST 2094-20 (Philips), ST 2094-30 (Technicolor), and ST 2094-40 (Samsung).

The system 125 includes a dynamic range converter 150 that, for example, converts an HDR video signal to an SDR video signal and/or provides other dynamic range conversion. For example, the video signal 110 can be received via a television receiver, cable television receiver, satellite broadcast receiver, broadband modem, a Multimedia over Coax Alliance (MoCA) interface, Ethernet interface, local area network transceiver, Bluetooth, 3G or 4G transceiver and/or other information receiver or transceiver or network interface that is capable of receiving one or more received signals such as a broadcast video signal, a multicast video signal, a unicast video signal, and/or can be generated from a stored video file, played back from a recording medium such as a magnetic tape, magnetic disk or optical disk. The video signals 110 can include or no include an accompanying audio signal, but video signals may include associated dynamic color transform metadata, such as metadata generated in accordance with SMPTE ST 2094 or other metadata that can be sued to assist in dynamic range conversion.

The video signal 110 and/or processed video 112 can be uncompressed digital signals or be a compressed digital video signal complying with a digital video codec standard such as H.264, MPEG-4 Part 10 Advanced Video Coding (AVC), VC-1, H.265, or another digital format such as a Motion Picture Experts Group (MPEG) format (such as MPEG1, MPEG2 or MPEG4), QuickTime format, Real Media format, Windows Media Video (WMV) or Audio Video Interleave (AVI), etc. The video signal 110 and/or processed video 112 can also include a high definition media interface (HDMI) signal, digital video interface (DVI) signal, a composite video signal, a component video signal, an S-video signal, and/or be formatted in another video format.

Further details regarding the operation of the dynamic range converter 150 including several optional functions and features are presented in conjunction with FIGS. 3-13 that follow.

Figure 3:
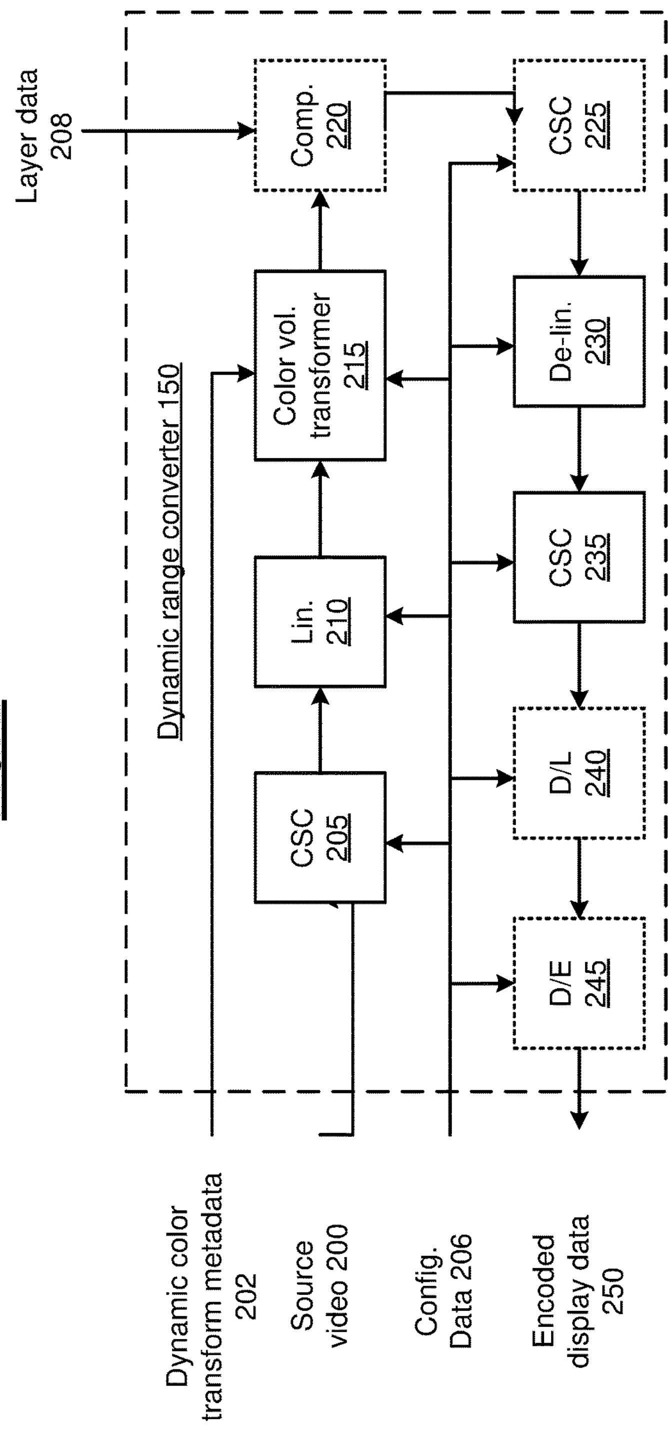
FIG. 3 presents a block diagram representation of a dynamic range converter in accordance with an embodiment of the present disclosure.

FIG. 3 presents a block diagram representation of a dynamic range converter in accordance with an embodiment of the present disclosure. In particular, an embodiment of dynamic range converter 150 is presented that includes color space converters 205 and 235, linearizer 210 and delinearizer 230, color volume transformer 215, and optional compositor 220, color space converter 225, dithering limiter 240 and display encoder 245. In various embodiments, the color space converters 205 and 235, linearizer 210 and delinearizer 230, color volume transformer 215, and optional compositor 220, color space converter 225, dithering limiter 240 and display encoder 245 are implemented via a plurality of circuits such as a plurality of processing devices. Each processing device may be a microprocessor, micro-controller, digital signal processor, vector processor, microcomputer, central processing unit, field programmable gate array, programmable logic device, state machine, logic circuitry, digital circuitry, look-up table and/or any device that manipulates digital signals based on hard coding of the circuitry and/or operational instructions.

The circuits that implement the dynamic range converter 150 can be configurable based on configuration data 206 to differing color spaces, dynamic ranges including a source dynamic range, mastering dynamic range, display dynamic range etc., differing standards including differing dynamic color transform metadata formats, differing color spaces (YCbCr, linear or nonlinear RGB, RGBY, (R-Y), (G-Y), (B-Y), BT.709, BT.601, BT.2020, sRGB, etc.) and other digital formats including input and output formats for each functional block, different encoding standards, frame rates, device resolutions, differing transfer functions and inverse transfer functions, and configuration of other selectable functions and features. In additions, the various individual functional blocks of dynamic range converter 150 can optionally be enabled or disabled depending on the requirements of a particular application of dynamic range converter 150. In addition, the circuits that implement the dynamic range converter 150 can be configured in a processing pipeline for operation timed by a pixel clock, with dynamic color transform metadata 202 applied on a frame by frame basis generate display data that reflects the artistic intent for each frame. In particular, the circuits that implement the dynamic range converter 150 can each include one or more registers or other memory that stores the configuration data 206 such as matrix dimensions, matrix coefficients, weighting coefficients, block enable/disable data, look-up table data representing transfer functions and inverse transfer functions and other configuration parameters used to configure the circuit to the particular conversion process currently being run, and in the case of the color volume transformer 215, to further store the current dynamic color transform metadata 202 corresponding to the current or next frame or scene of the source video 200 being processed.

In operation, the color space converter 205 converts a source color space of a source video 200, having a source dynamic range, to non-linear color space signals. The linearizer 210 converts the non-linear color space signals to linearized color space signals at a mastering dynamic range via a piecewise linear interpolation of a transfer function. The transfer function can be an electro-optical transfer function as specified in SMPTE ST 2084, another electro-optical transfer function, a gamma function of other non-linear compression function. The color volume transformer 215 applies dynamic color transform metadata 202 associated with the source video 200 to generate master adjusted color space signals from the linearized color space signals. Optional compositor 220 layers the master color space signals with further data planes such as layer data 208 and optional color space converter 225 can apply additional color space conversion. The delinearizer 230 converts the master adjusted color space signals (optionally composited with one or more video or graphics layers and/or subjected to additional color conversion) to non-linearized color space signals via a piecewise linear interpolation of an inverse of the transfer function used by linearizer 210 and in accordance with a display dynamic range. The color space converter 235 converts the non-linearized color space signals to display domain signals. The optional dithering limiter 240 reduces a number of bits in display domain signals to generate video display data and the optional display encoder 245 generates encoded video display data 250, based on the display data that indicates the display domain signals.

The dynamic range converter 150 can provide a generic and reconfigurable architecture to cover a wide variety of HDR standards and proposals. In various embodiments, the source dynamic range, mastering dynamic range and/or the display dynamic range are each independently configurable based on the configuration data 206. The shifters of the linearizer 210 can convert the source dynamic range of the color components into a mastering dynamic range that comports with the dynamic color transform metadata applied by color volume transformer 215 to recreate the artist's intent. In a similar fashion, shifters of the delinearizer 230 can convert the mastering dynamic range of the color components into a display dynamic range that, for example, comports with capabilities of the display encoder 245 and/or a display device that will reproduce the video. In this fashion, the dynamic range converter 150 can selectively operate in a first mode of operation where the source dynamic range is a high dynamic range and the display dynamic range is a standard dynamic range at selectable mastering dynamic range levels.

For example, the dynamic range converter 150 can be programmed to support multiple HDR to SDR standard applications such as those proposed in SMPTE working group, "TC-10E DG Dynamic Metadata for Color Transforms of HDR and WCG Images", and/or an ULTRA HD Blu-ray specification, however, other modes reflecting other source and display dynamic ranges are likewise selectable for implementation based on the configuration data 206. In addition, the dynamic range converter 150 is capable of SDR to HDR conversion. While there is no proposed standard method for delivery of SDR plus metadata to an HDR capable display, video can be mastered in HDR and data can be transported that is representative of SDR frames plus information (via metadata) for up conversion of each frame to HDR.

Consider an example where dynamic range converter 150 converts 4 k/60 fps HDR source video 200 in the form of 12-bit YCbCr (4:4:4) in the BT.2020 color space to SDR encoded display data 250 in the form of 12-bit HDMI data. After zero-leveling, the HDR data can be represented as 12 fractional bits and 1 sign bit. As discussed above, the functional blocks are pipelines and operate based on a pixel-clock to output individual pixels in the converted format, one pixel per clock cycle. The color space converter 205 converts each pixel in the 12-bit YCbCr color space of a source video 200 at a source dynamic range of 10K cd/$m^2$, to a corresponding pixel in a 20-bit nonlinear R'G'B' color space signals via a 3×3 matrix operation. In particular, each individual linear color value of each pixel is proportional to the luminance value, where 1.0 corresponds to reference luminance, Lref, of 10 K cd/$m^2$ defined to be 10,000 cd/m^2 in ST 2084.

The linearizer 210 the 20-bit nonlinear R'G'B' color space signals to 20-bit linear RGB color space signals via a piecewise linear interpolation of the EOTF transfer function specified by SMPTE ST 2084 and shifts the data to a mastering dynamic range, Lmastering, of 5 K cd/$m^2$. By, for example, scaling the linear color values by Lmastering/Lref (0.5 in this case) and then saturating or otherwise normalizing to 1.0 to result in a reduction in the dynamic range if Lmastering<Lref. This reduced dynamic range matches the dynamic range in mastering.

The color volume transformer 215 applies dynamic color transform metadata 202 in accordance with SMPTE ST 2094 associated with the source video 200, on a frame by frame basis, to generate master adjusted color space signals in 20-bit RGB. Color volume transforms are applied to recreate the mastering artist's intent, using metadata generated by the artist for each frame or scene, to prepare the image for dynamic range compression.

Optional compositor 220 layers the master color space signals with further graphics and video planes and optional color space converter 225 applies additional color space conversion to convert to 20-bit RGB via a 3×3 matrix operation. The delinearizer 230 operates via a piecewise linear interpolation of an inverse EOTF transfer function specified by SMPTE ST 2084 to generate 20-bit nonlinear R'G'B' and shifts the data to a display dynamic range, Ldisplay, of 100 cd/$m^2$ via a scaling by Ldisplay/Lmastering and saturation or other normalizing back to 1.0. The color space converter 235 converts to 20-bit Y'Cb'Cr' via a 3×3 matrix operation. The dithering limiter 240 reduces a number of bits in display domain signals to generate 12-bit Y'Cb'Cr' video display data and the display encoder 245 generates HDMI encoded video display data 250.

Consider an example where the video signal has 4096×2160 (4 k) resolution and is 60 fps with a frame time of 16.7 ms. The architecture can implement low-latency dynamic range conversion. In various embodiments, the latency can be 0.5 seconds or less or very low latency such as 200 msec or less.

Figure 4:
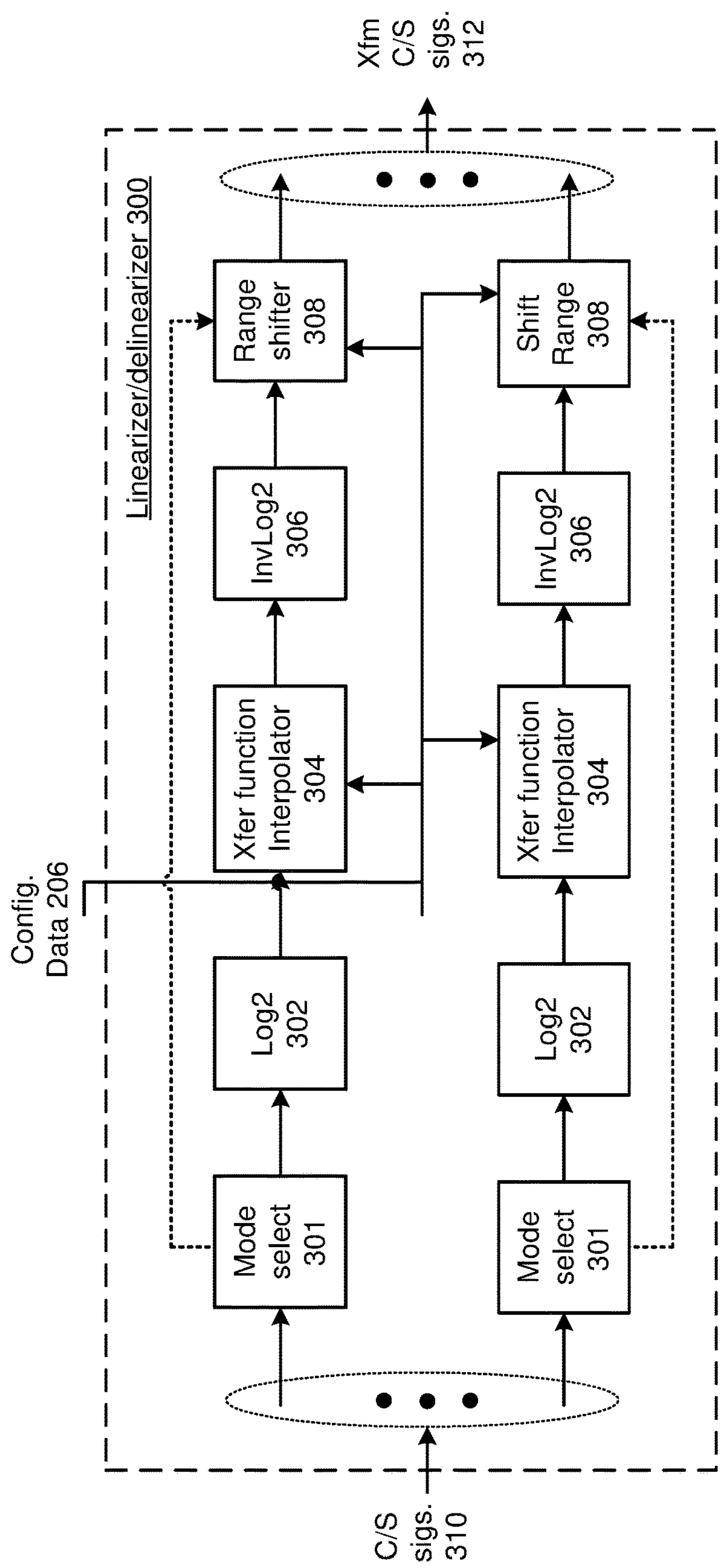
FIG. 4 presents a block diagram representation of a linearizer/delinearizer in accordance with an embodiment of the present disclosure.

FIG. 4 presents a block diagram representation of a linearizer/delinearizer in accordance with an embodiment of the present disclosure. In particular linearizer/delinearizer 300 includes a look-up table that converts an input signal into a log2 domain signal and determines a slope and intercept based on a piecewise linear representation of a particular log2 domain transfer function that is programmable based on configuration data 206. An adder and a multiplier generate an interpolated result by interpolating the log2 domain signal based on the slope and intercept. The look-up table generates an output signal based on an inverse log2 conversion of the interpolated result that can be shifted to scale the output to a desired dynamic range. The use of log2 based lookup tables can result in a smaller silicon area and less error (than linear tables), particularly when a nonlinear transfer function is logarithmic or substantially algorithmic.

Considering the example shown, a linearizer/delinearizer 300 is presented that can function as linearizer 210 and/or delinearizer 230 presented in conjunction with FIG. 3. Color space signals 310, such as nonlinear R'G'B' color components in the case of linearizer 210 or linear RGB color components in the case of delinearizer 230, are converted to transformed colors space signals 312 having linear or nonlinear color components as the case may be. The color component x of the color space signals 310 are converted to log2 domain via log2 look-up tables 302. Consider the case where a transfer function ƒ(x) (including an inverse transfer function) is implemented, in the log2 domain, the x is converted to log2(x), a different function ƒ' is employed where:

$$f'(a)=\log 2(f(a))$$

Since the color space signals 310 have the range [0,1], the log2 domain conversion results in a log2 value x for each color component in the range [−xmax,0], where −xmax is the largest negative number that can be represented based on the number of bits in the signal. An optional mode select 301 determines one of a plurality of modes to apply based on the value of x. For example, in the normal case, the value of x itself is converted to log2(x) used to determine ƒ'(log2(x)) based on a transfer function interpolator 304 that uses a piecewise linear approximation of a log2 domain transformation the particular transfer function to generate a corresponding slope, m, and y-intercept, b, of the piece-wise linear function that corresponds to the value of log2(x). The transfer function interpolator 304 calculates the value of:

$$y=f'(\log 2(x))=m(\log 2(x))+b.$$

In this normal mode, transfer function interpolators 304 generate intercept and slope values indexed by the value of log2(x) and uses an adder and multiplier to generate the value of ƒ(log2(x)) in the log2 domain for inverse log2 conversion by invlog2 look-up tables 306.

In cases where x is greater than a predetermined or programmable threshold T1, such as when x is close to 1, the mode select 301 can select a reverse mode where x'=1−x is used instead. This is useful in the case where the transfer function in the log2 domain does not well for values near 1.0 where there is less resolution. In this case, transfer function interpolators 304 use a look-up of slope and intercept based on:

$$y=f'(\log 2(x'))=m(\log 2(x'))+b.$$

In cases where the value of x is smaller than a programmable threshold T2, such as when x is close to 0, the mode select 301 can select a bypass mode that calculates the output directly based on a pre-determined slope $m_0$ and intercept $b_0$. This is useful in the case where the transfer function ƒ(x) is highly linear in the region where x is close to 0. In particular, the log2 conversion, log2 domain interpolation and inverse log conversion can be bypassed and the output value can be calculated directly as:

$$y=m_0x+b_0.$$

As shown, range shifters 308 are programmable based on configuration data 206 to scale the dynamic range of the transform color space signals 312. For example, the range shifters 308 can scale the dynamic range at the input from Lref to Lmaster in the case of linearizer 210, or at the output from Lmaster to Ldisplay, in the case of delinearizer 230.

Figure 6:
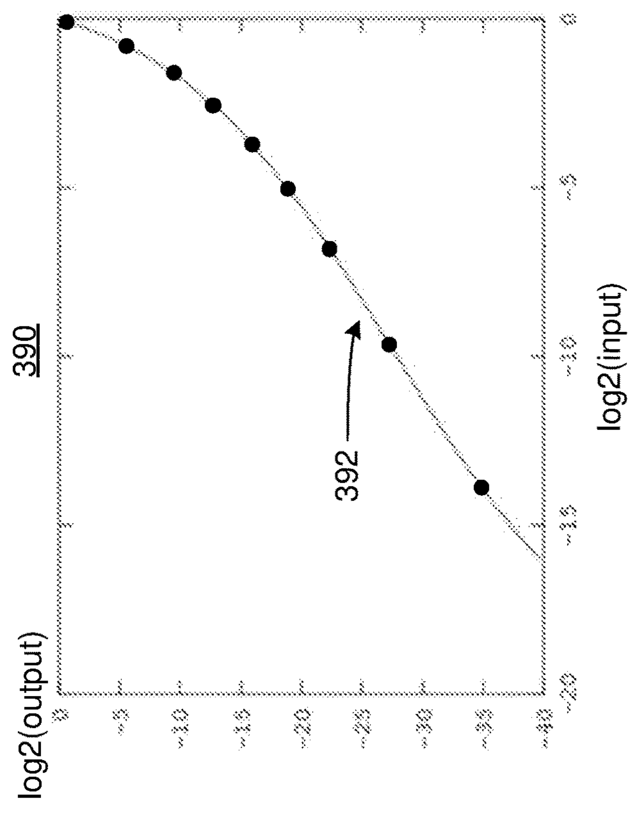
FIG. 6 presents a graphical representation of a log2 domain transfer function in accordance with an embodiment of the present disclosure.
Figure 5:
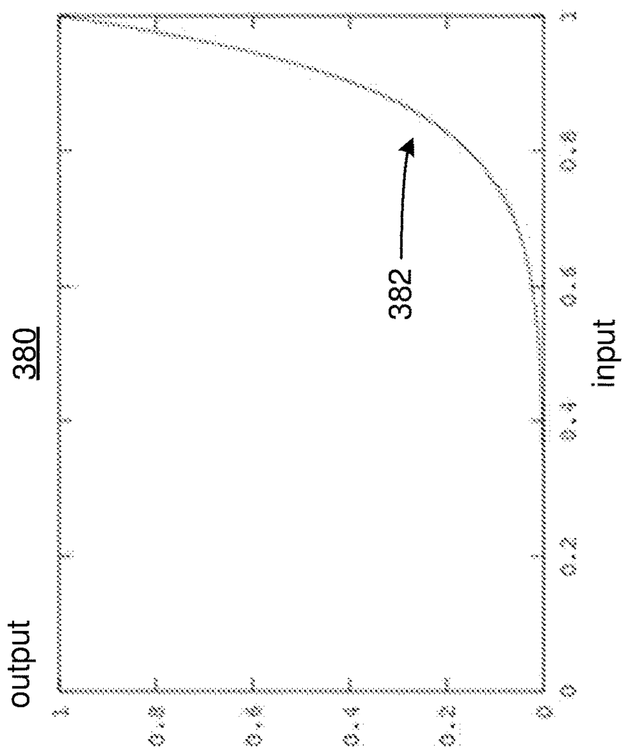
FIG. 5 presents a graphical representation of a transfer function in accordance with an embodiment of the present disclosure.

FIG. 5 presents a graphical representation 380 of a transfer function in accordance with an embodiment of the present disclosure and FIG. 6 presents a graphical representation 390 of a log2 domain transfer function in accordance with an embodiment of the present disclosure. In particular, the transfer function 382 represents the EOTF as defined in ST 2084, while transfer function 392 represented the EOTF in the Log2 domain, on a log2-log2 scale. When implementing the EOTF function with a piecewise linear lookup table, the table memory contains a fixed number of pieces, or words, delineated by the dark circles on the graph, with corresponding y-intercept and slope values stored as fixed-point integers. In particular, highly linear regions of the function can be implemented via longer segments than regions that are less linear, while maintaining relatively similar error bounds. While a number dark circles are shown that delineate a number of segments, greater or fewer segments can likewise be implemented.

The log2-domain transfer function is appealing in this implementation because: a) the plot looks substantially linear which lends itself well to the interpolation between fewer segments; b) the values of y-intercept and slope can fit in to a smaller number of bits when represented by fixed-point integers; and c) one programmable table, such as a 64×32 RAM can be used for all the converter's lookup tables providing a great variability of transfer functions through software reconfiguration.

Figure 7:
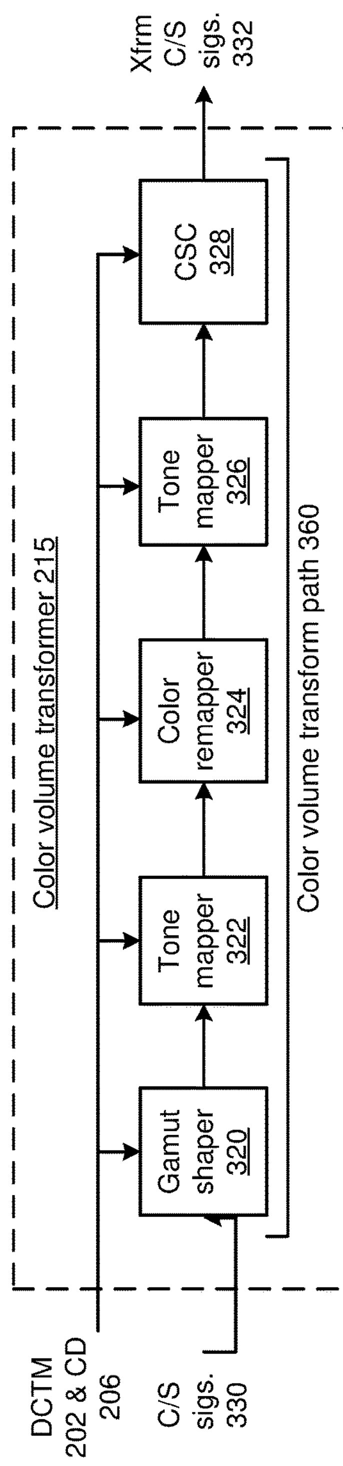
FIG. 7 presents a block diagram representation of a color volume transformer in accordance with an embodiment of the present disclosure.

FIG. 7 presents a block diagram representation of a color volume transformer in accordance with an embodiment of the present disclosure. In particular an implementation of color volume transformer 215 is shown implemented by a series of blocks that can each be implemented by a corresponding circuit in a color volume transform path 360. The blocks in the color volume transform path 360 can be configured in a pipelined configuration and clocked, based on a pixel clock, to produce one pixel output per cycle of the pixel clock. Not only are the blocks of in the color volume transform path 360 independently configurable based on configuration data 206, they are also programmable according to the dynamic color transform metadata 202 that is associated with the source video.

In various embodiments, the color volume transformer 215 applies gamut shaping, luminance tone mapping, chrominance tone mapping and/or additional color space conversion to generates transformed color space signals 332 from color space signals 330. In operation, the gamut shaper 320 applies gamut shaping to linearized color space signals in accordance with the dynamic color transform metadata 202 to generate gamut shaped components. The tone mapper 322 applies chrominance tone mapping by scaling the gamut shaped components in accordance with the dynamic color transform metadata 202 to generate chrominance mapped components. A color remapper 324 color converts the chrominance mapped components in accordance with the dynamic color transform metadata 202 to generate color remapped components. The tone mapper 326 applies luminance tone mapping by scaling the color remapped components in accordance with the dynamic color transform metadata 202 to generate luminance mapped components. The color space converter 328 color converts the luminance mapped components in accordance with the dynamic color transform metadata 202 to generate transform color space signals 312 that are master adjusted to the intent of the artist.

The gamut shaper 320, color remapper 324 and color space converter 328 as well as the tone mappers 322 and 326 can each be implemented via circuits such as a processing device. Each processing device may be a microprocessor, micro-controller, digital signal processor, vector processor, microcomputer, central processing unit, field programmable gate array, programmable logic device, state machine, logic circuitry, digital circuitry, look-up table and/or any device that manipulates digital signals based on hard coding of the circuitry and/or operational instructions.

In particular, the circuits that implement the color volume transformer 215 can be configurable based on configuration data 206 to differing color spaces, dynamic ranges including a source dynamic range, and mastering dynamic range, differing standards including differing dynamic color transform metadata formats, differing color spaces (YCbCr, linear or nonlinear RGB, RGBY, (R-Y), (G-Y), (B-Y), BT.709, BT.601, BT.2020, sRGB, etc.) and configuration of other selectable functions and features. In addition, the circuits that implement the color volume transformer 215 can be configured in a processing pipeline for operation timed by a pixel clock, with dynamic color transform metadata 202 applied on a frame by frame basis to generate transform color space signals 332 that reflect the artistic intent for each frame. In particular, the circuits that implement the color volume transformer 215 can each include one or more registers or other memory that stores the configuration data 206 such as matrix dimensions and look-up table data representing log2 and inverse log2 conversions and other configuration parameters used to configure the circuits to the particular conversion process currently being run, and further to store the dynamic color transform metadata 202 such as matrix coefficients, weighting coefficients, and other dynamic color transform metadata 202 corresponding to the current or next frame or scene of the source video 200 being processed.

For example, the color space signals 330 can be 20-bit RGB signals. The gamut shaper 320 can include a color space converter that performs a 4×4 matrix conversion to generate gamut shaped color components in 20-bit RGBY format that are chrominance tone mapped by tone mapper 322 to generate chrominance mapped components in 20-bit RGBY format. The color remapper 324 can include a color space converter that performs a 4×4 matrix conversion to generate 20-bit RGBY color remapped components that are luminance tone mapped by tone mapper 326 to generate tone mapped components in 20-bit RGBY format. The color space converter 328 can perform a 3×4 matrix conversion to generate the transform color space signals 332 in RGB format. The use of 4×4 and 3×4 matrices allow the various blocks to operate based on linear combinations of (R, G, B, Y) in one configuration set by configuration data 206. In other configurations, difference signals such as (R-Y), (G-Y), (B-Y) or 3×3 matrix operations with (R, G, B) can likewise be used. Further details regarding the operation of tone mapper 322 and 326 including several optional functions and features are presented in conjunction with FIG. 8 that follows.

Figure 8:
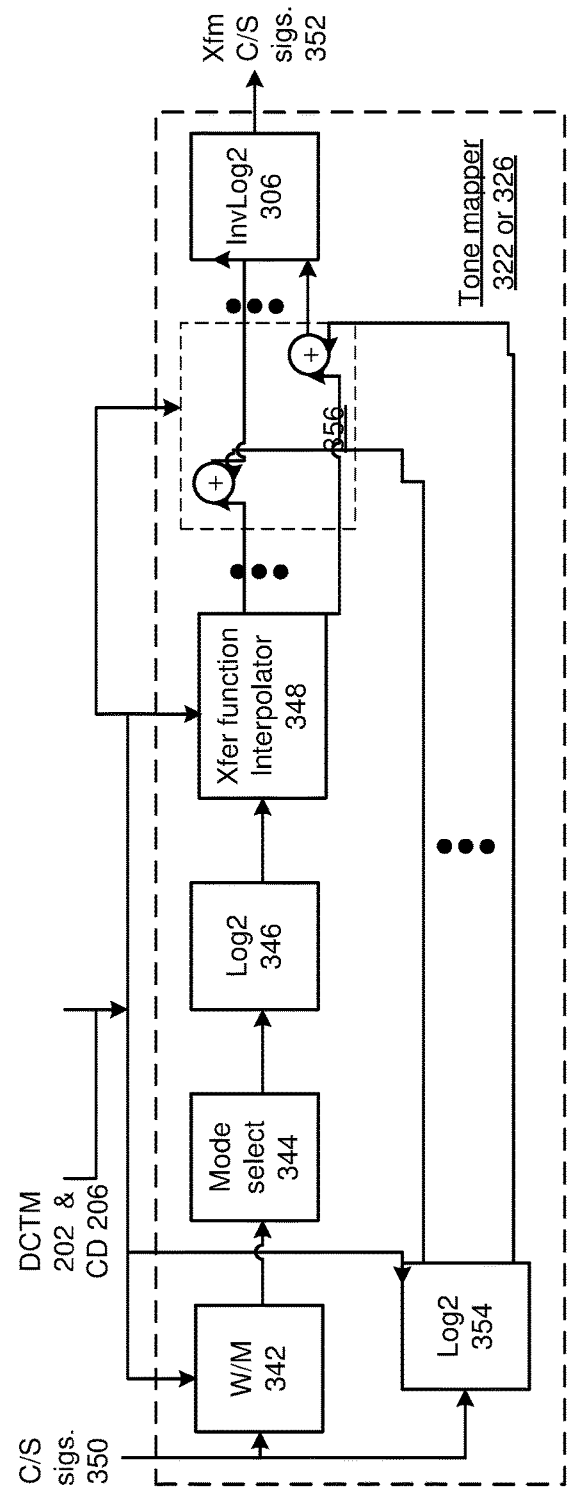
FIG. 8 presents a block diagram representation of a tone mapper in accordance with an embodiment of the present disclosure.

FIG. 8 presents a block diagram representation of a tone mapper in accordance with an embodiment of the present disclosure. In particular a tone mapper 322 or 326 is presented that includes weighting module 342, mode select 344, log2 look-up tables 346 and 354, transfer function interpolator 348, adders 356 and inverse log2 look-up table 354. The tone mapper converts color space signals 350 into tone mapped color space signals 352, for example, in formats described in conjunction with FIG. 7.

The tone mapper 322 or 326 can be set in either a scale mode or a translate mode based on the configuration data 206 or dynamic color transform metadata 202. In a chrominance tone mapper implementation (tone mapper 322) that is set in a scale mode, the weighting module 342 generates a weighted maximum of gamut shaped components in formats (such as R, G, B and Y) specified by the dynamic color transform metadata 202 and further based on weighting coefficients established by the dynamic color transform metadata 202. The mode select 344, log2 look-up table 346 and transfer function interpolator 348 operate in a similar fashion to mode select 301, log2 look-up table 302 and transfer function interpolator 304, to obtain a scale factor for each of the gamut shaped components.

In a normal mode of operation set by mode select 344 (in the scale mode), the value of the weighted maximum in the log2 domain is used as an index in three chrominance mapping tables programmed in response to the dynamic color transform metadata to reflect the artist's intent, one for each of the color components (such as R, G and B). Slope and y-intercept values for each of the three components are used to generate these three scale factors. Reverse mode (in the scale mode can be implemented), as previously discussed, by mode select 344 for values of the weighted maximum close to 1. The resulting scale factors in the log2 domain are added by adders 356 to log2 domain values of the color components (such as R, G and B) that are generated by log2 look-up table 354. Adding these values in the log2 domain operates as multiplication to generate scaled gamut shaped components. Inverse log2 look-up table 306 generates the chrominance mapped components by inverse log2 conversion of the scaled gamut shaped components.

When the translate mode is set based on the configuration data 206 or dynamic color transform metadata 202, the weighting module 342, log2 look-up table 354 and adders 356 are bypassed and the gamut shaped color components (such as R, G and B) in the log2 domain are directly translated by the transfer function interpolator 348 based on corresponding tables that are programmed in response to the dynamic color transform metadata 202 to reflect the artist's intent. In the case the transfer function interpolator directly generates the chrominance mapped components in the log2 domain.

In addition to configuration to scale or translate mode as discussed above, the tone mapper 322 or 326 can be configurable based on configuration data 206 to differing mastering dynamic ranges, differing color spaces (RGB, RGBY, (R-Y), (G-Y), (B-Y)) and other differing configurations that implement other selectable functions and features.

In a luminance tone mapper implementation, the components of the tone mapper 326 are implemented similarly to generate transform color space signals 352 in the form of luminance mapped components in response to color space signals 350 in the form of color remapped components. In particular, the transfer function interpolator 348 implements three luminance mapping tables that are programmed in response to the dynamic color transform metadata 202 to reflect the artist's intent.

Figure 9:
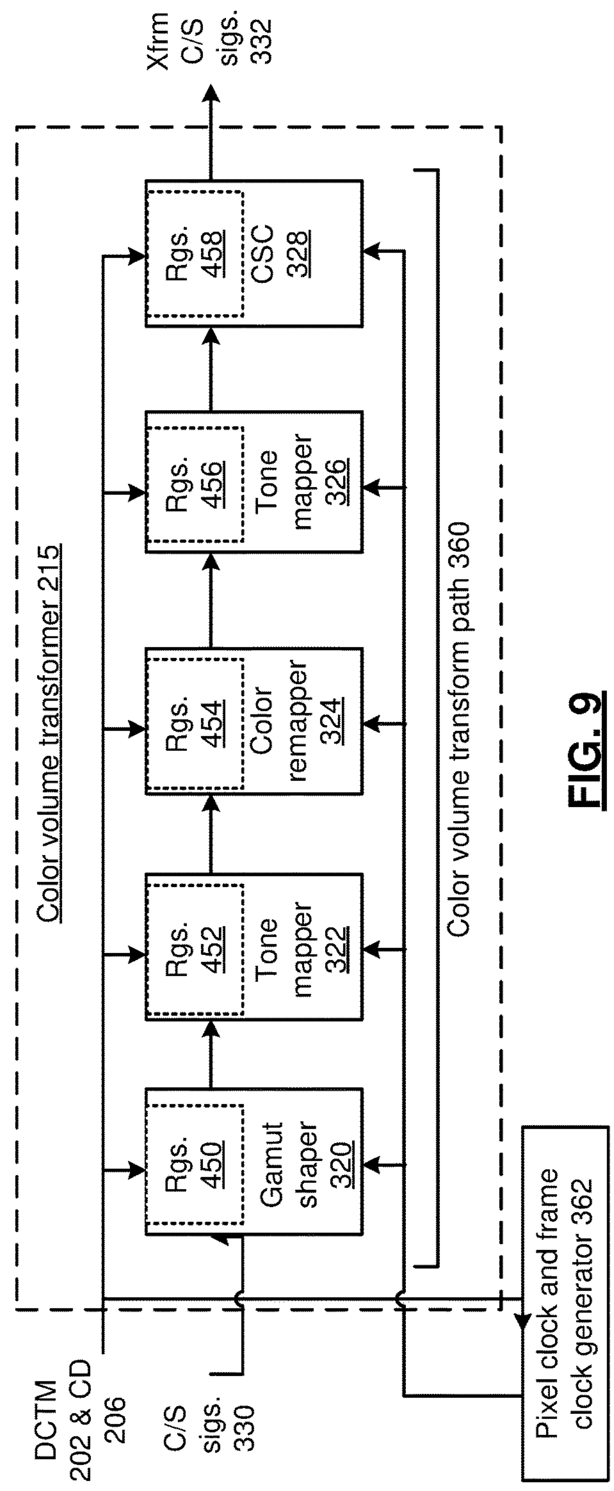
FIG. 9 presents a block diagram representation of a color volume transformer in accordance with an embodiment of the present disclosure.

FIG. 9 presents a block diagram representation of a color volume transformer in accordance with an embodiment of the present disclosure. As discussed in conjunction with FIG. 7, the circuits that implement the color volume transform path 360 of the color volume transformer 215 can be configured in a processing pipeline for operation timed by a pixel clock to produce one pixel output per cycle of the pixel clock 366. In addition, the dynamic color transform metadata 202 can be applied on a frame by frame basis to generate transform color space signals 332 that reflect the artistic intent for each frame. The pixel and frame clock generator 362 is provided to generate the pixel clock and a frame clock based on configuration data that indicates, for example, the frame rate, the number of pixels per frame and/or other timing information.

In various embodiments, the circuits in the color volume transform path 360 can each include a plurality of registers that store the configuration data 206 and the dynamic color transform metadata 202. As shown, gamut mapper 320 includes registers 450, tone mapper 322 includes registers 452, color remapper 324 includes registers 454, tone mapper 326 includes registers 456 and color space converter 328 includes registers 458. Any of the registers 450, 452, 454, 456 and 458 can be implemented by a processor register, cache, buffer memory or other memory that stores the configuration data 206 and dynamic color transform metadata 202. In this fashion, configuration data 206, such as matrix dimensions and look-up table data representing log2 and inverse log2 conversions and other configuration parameters can be stored in the corresponding circuits that use this data, to configure each circuit to the particular conversion process currently being run. In addition, the registers or other memory can further store the dynamic color transform metadata 202 such as matrix coefficients, weighting coefficients, and other dynamic color transform metadata 202 in corresponding circuits to conform with the current or next frame or scene of the source video 200 being processed. The registers that store the dynamic color transform metadata 202 for each frame can be shadowed and swapped at frame boundaries to facilitate the frame by frame processing.

In various embodiments, in a time period where an $(n-1)^{st}$ video frame is being processed by the color volume transformer 215, the color volume transformer 215 loads the dynamic color transform metadata 202 associated with an $n^{th}$ video frame of the source video 200 in first ones of the registers 450, 452, 454, 456 and 458. During the next time period, the color volume transformer 215 processes the $n^{th}$ video frame using the dynamic color transform metadata 202 associated with the $n^{th}$ frame of the source video loaded in the first ones of the registers 450, 452, 454, 456 and 458. During that same time period wherein the $n^{th}$ video frame is being processed, the color volume transformer 215 loads the dynamic color transform metadata 202 associated with the $(n+1)^{st}$ video frame of the source video in second ones of the registers 450, 452, 454, 456 and 458. During the next time period, the color volume transformer 215 processes the $(n+1)^{st}$ video frame using the dynamic color transform metadata 202 associated with the $(n+1)^{st}$ frame of the source video loaded in the second ones of the registers 450, 452, 454, 456 and 458. During that same time period wherein the $(n+1)^{st}$ video frame is being processed, the color volume transformer 215 loads the dynamic color transform metadata 202 associated with a $(n+2)^{nd}$ frame of the source video in first ones of the registers 450, 452, 454, 456 and 458, etc.

In this fashion, two sets of registers for each circuit can be alternatively loaded when not in use and swapped back and forth at the boundary of each successive frame as required to meet the needs of the processing of the current video frame. In particular, the frame boundary can be determined based on processing of the last pixel of each frame as indicated based on a frame clock 364 or a counter based on the pixel clock. Because the circuits of color volume transformer 215 are configured in a processing pipeline for operation timed by the pixel clock to produce one pixel output per cycle of the pixel clock, the frame boundary appears for each circuit at staggered times in accordance with the pipelined configuration. In particular, each circuit swaps registers when the frame boundary occurs for that circuit—at the time processing of the last pixel of the prior frame is complete and processing of the first pixel of the next frame is about to begin.

For example, consider the case where there are p pixels in a frame. If the color space converter 328 is processing the pixel p (corresponding to the last pixel in a frame), tone mapper 326 is processing pixel p-1, color remapper 324 is processing pixel p-2, tone mapper 322 is processing pixel p-3 and gamut shaper 320 is processing pixel p-4. At the next cycle of the pixel clock, the color space converter 328 crosses the frame boundary and swaps registers 458 to begin using the dynamic color transform metadata 202 for the new frame to process the pixel 1 (the first pixel in the new frame). At this same time, the tone mapper 326 processes pixel p of the prior frame, color remapper 324 processes pixel p-1 of the prior frame, tone mapper 322 processes pixel p-2 of the prior frame and gamut shaper 320 processes pixel p-3 of the prior frame. At the next cycle of the pixel clock, the color space converter 328 processes pixel 2 of the new frame, the tone mapper 326 crosses the frame boundary and swaps registers 456 to begin using the dynamic color transform metadata 202 of the new frame to begin processing of the pixel 1 of the new frame, color remapper 324 processes pixel p of the prior frame, tone mapper 322 processes pixel p-1 of the prior frame and gamut shaper 320 processes pixel p-2 of the prior frame, etc. It should be noted that the foregoing is merely one example of possible implementations and in further that one or more blocks in the processing pipeline can include one or more functions that operate in sub-pixel time.

Figure 10:
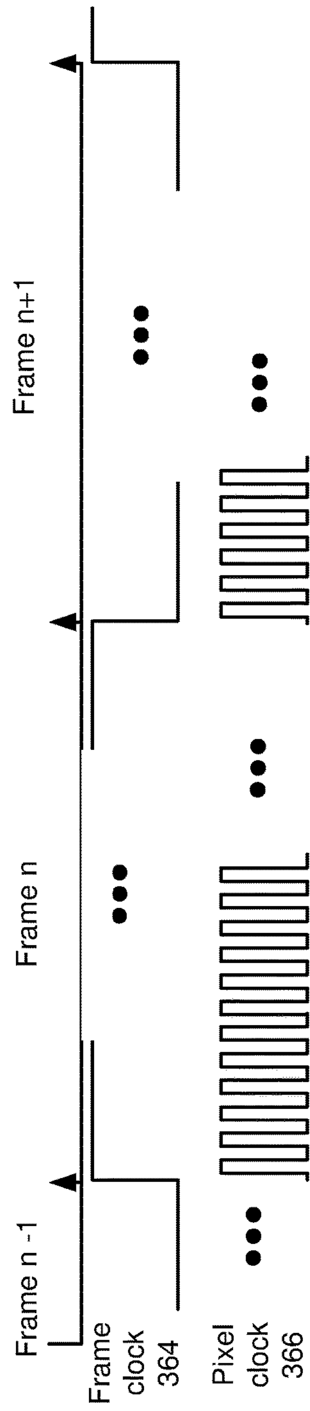
FIG. 10 presents a graphical representation of clock signals in accordance with an embodiment of the present disclosure.

FIG. 10 presents a graphical representation of clock signals in accordance with an embodiment of the present disclosure. In particular, examples of frame clock 364 and pixel clock 366 are presented. In the embodiment shown, the pixel clock 366 has a number of pixel clock cycles for each frame duration corresponding to the number of pixels in each frame. The frame clock 364 shown has two states, each having a duration that corresponds to the duration of a single frame.

As discussed in conjunction with FIG. 9, a pixel and frame clock generator can generate the pixel clock 366 and frame clock 364 based on configuration data 206 that indicates, for example, the frame rate, the number of pixels per frame and/or other timing information. While particular examples of the pixel clock 366 and frame clock 364 are shown, it should be noted that in other embodiments, a frame clock that has a single clock cycle per frame can likewise be implemented. Further, while a single frame clock 364 is shown, a plurality of staggered frame clocks can be used, each timed to correspond to the frame boundary of one of the circuits of color volume transformer 215 in the processing pipeline.

FIG. 11 presents a flowchart representation of a method in accordance with an embodiment of the present disclosure. In particular, a method is presented for use with one or more functions and features discussed in conjunction with FIGS. 1-10. Step 400 includes converting a source color space of a source video having a source dynamic range to nonlinear color space signals. Step 402 includes converting the nonlinear color space signals to linearized color space signals having a mastering dynamic range via a piecewise linear interpolation of a transfer function. Step 404 includes color volume transforming the linearized color space signals on a frame by frame basis, based on dynamic color transform metadata associated with the source video, to generate master adjusted color space signals. Step 406 includes delinearizing the master adjusted color space signals to nonlinearized color space signals via a piecewise linear interpolation of an inverse transfer function in accordance with a display dynamic range. Step 408 includes converting the nonlinearized color space signals to display domain signals.

In various embodiments, the color volume transforming includes: loading in a plurality of first registers prior to a first time period, the dynamic color transform metadata associated with a first video frame of the source video; processing first frame data corresponding to the first video frame of the source video during the first time period using the dynamic color transform metadata associated with the first video frame of the source video loaded in the plurality of first registers; loading in a plurality of second registers during the first time period, the dynamic color transform metadata associated with a second video frame of the source video; processing second frame data corresponding to the second video frame of the source video during a second time period that is after the first time period, using the dynamic color transform metadata associated with the second video frame of the source video loaded in the plurality of second registers; and loading in the plurality of first registers during the second time period, the dynamic color transform metadata associated with a third video frame of the source video.

The color volume transforming can switch from processing of the video data corresponding to the first video frame of the source video to processing of the video data corresponding to the second video frame of the source in response to frame boundary. In addition, the color volume transforming van operate via a plurality of circuits in a pipelined configuration under control of a pixel clock, and the frame boundary can be determined based on processing of the last pixel of the first frame. A plurality of circuits used in the color volume transforming can be switched from processing of the video data corresponding to the first video frame of the source video to processing of the video data corresponding to the second video frame of the source video in response to the frame boundary at staggered times in accordance with the pipelined configuration.

In various embodiments, the method includes configuring at least one configurable circuit based on configuration data, to perform any of the steps 400, 402, 404, 406 or 408. The configuration data can indicate the source dynamic range, the master dynamic range and the display dynamic range. The transfer function can be configured based the configuration data as one of: an electro-optical transfer function or a gamma function and the inverse transfer function is configured based the configuration data as a corresponding one of: an inverse of the electro-optical transfer function or an inverse of the gamma function. The color volume transforming can apply luminance tone mapping and chrominance tone mapping in accordance with a color component space indicated by the configuration data. The color volume transforming can apply gamut shaping, color remapping and additional color space conversion in accordance with a color component space indicated by the configuration data.

In various embodiments, the method can include controlling a plurality of circuits in a processing pipeline via a pixel clock that implements one or more of the steps 400, 402, 404, 406 and 408. Each of the plurality of circuits can output a pixel at a rate of one pixel per clock cycle of the pixel clock. The processing pipeline can further include layering the master color space signals with further data planes prior to delinearizing and/or color converting the master color space signals prior to prior to delinearizing. The color volume transforming can include: applying gamut shaping to the linearized color space signals in accordance with the dynamic color transform metadata to generate gamut shaped components; applying chrominance tone mapping by scaling the gamut shaped components in accordance with the dynamic color transform metadata to generate chrominance mapped components; color converting the chrominance mapped components in accordance with the dynamic color transform metadata to generate color remapped components; applying luminance tone mapping by scaling the color remapped components in accordance with the dynamic color transform metadata to generate luminance mapped components; and color converting the luminance mapped components in accordance with the dynamic color transform metadata to generate the master adjusted color space signals.

FIG. 12 presents a flowchart representation of a method in accordance with an embodiment of the present disclosure. In particular, a method is presented for use with one or more functions and features discussed in conjunction with FIGS. 1-11. Step 410 includes converting a source color space of a source video having a source dynamic range to nonlinear color space signals. Step 412 includes converting the nonlinear color space signals to linearized color space signals having a mastering dynamic range via a piecewise linear interpolation of a transfer function. Step 414 includes color volume transforming the linearized color space signals based on dynamic color transform metadata associated with the source video to generate master adjusted color space signals. Step 416 includes delinearizing the master adjusted color space signals to nonlinearized color space signals via a piecewise linear interpolation of an inverse transfer function in accordance with a display dynamic range. Step 418 includes converting the non to nonlinearized color space signals to display domain signals.

The method can further include layering the master color space signals with further data planes prior to delinearizing and/or color converting the master color space signals prior to prior to delinearizing. The color volume transforming can include: applying gamut shaping to the linearized color space signals in accordance with the dynamic color transform metadata to generate gamut shaped components; applying chrominance tone mapping by scaling the gamut shaped components in accordance with the dynamic color transform metadata to generate chrominance mapped components; color converting the chrominance mapped components in accordance with the dynamic color transform metadata to generate color remapped components; applying luminance tone mapping by scaling the color remapped components in accordance with the dynamic color transform metadata to generate luminance mapped components; and color converting the luminance mapped components in accordance with the dynamic color transform metadata to generate the master adjusted color space signals.

Figure 13:
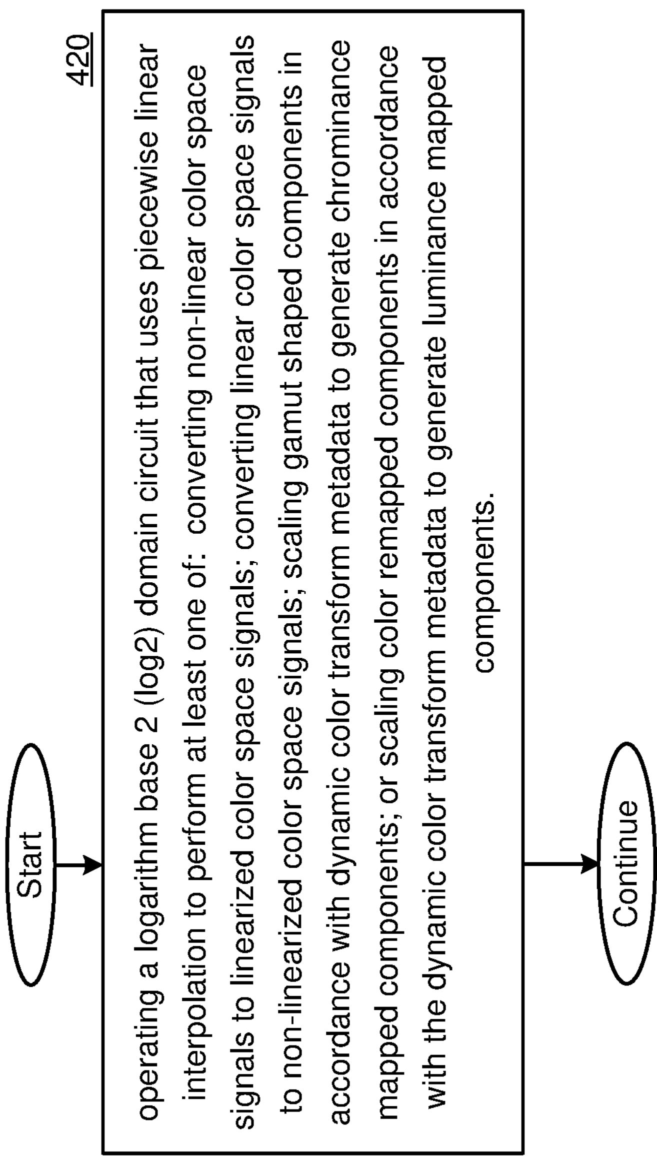
FIG. 13 presents a flowchart representation of a method in accordance with an embodiment of the present disclosure.

FIG. 13 presents a flowchart representation of a method in accordance with an embodiment of the present disclosure. In particular, a method is presented for use with one or more functions and features discussed in conjunction with FIGS. 1-11. Step 420 includes operating a logarithm base 2 (log2) domain circuit that uses piecewise linear interpolation to perform at least one of: converting nonlinear color space signals to linearized color space signals; converting linear color space signals to nonlinearized color space signals; scaling gamut shaped components in accordance with dynamic color transform metadata to generate chrominance mapped components; or scaling color remapped components in accordance with the dynamic color transform metadata to generate luminance mapped components.

In various embodiments, the log2 domain circuit is further operated to scale the dynamic range of at least one of: an input signal of the log2 domain circuit or an output signal of the log2 domain circuit. The input signal x can represent a positive value less than 1 and wherein for values of x greater than T, the log2 domain circuit can operate in a reverse mode based on 1−x. The operations of the log2 domain circuit further include converting an input signal into a log2 domain signal; determining a slope and intercept based on a piecewise linear representation of a log2 domain transfer function; generating an interpolated result by interpolating the log2 domain signal based on the slope and intercept; and generating an output signal based on an inverse log2 conversion of the interpolated result.

In various embodiments, the log2 domain transfer function can represent one of: an electro-optical transfer function, a gamma function, an inverse electro-optical transfer function or an inverse gamma function. The operations of the log2 domain circuit can further include: generating a weighted maximum of the gamut shaped components, based on the dynamic color transform metadata; obtaining a scale factor for the gamut shaped components based on the log2 domain circuit; multiplying the scale factor by corresponding ones of the gamut shaped components to generate scaled gamut shaped components; and generating the chrominance mapped components via an inverse log2 conversion of the scaled gamut shaped components. The operations of the log2 domain circuit can further include: generating a weighted maximum of the color remapped components, based on the dynamic color transform metadata; obtaining a scale factor for the color remapped components based on the log2 domain circuit; and multiplying the scale factor by corresponding ones of the color remapped components to generate scaled color remapped components and generating the luminance mapped components via an inverse log2 conversion of the scaled color remapped components.

Figure 14:
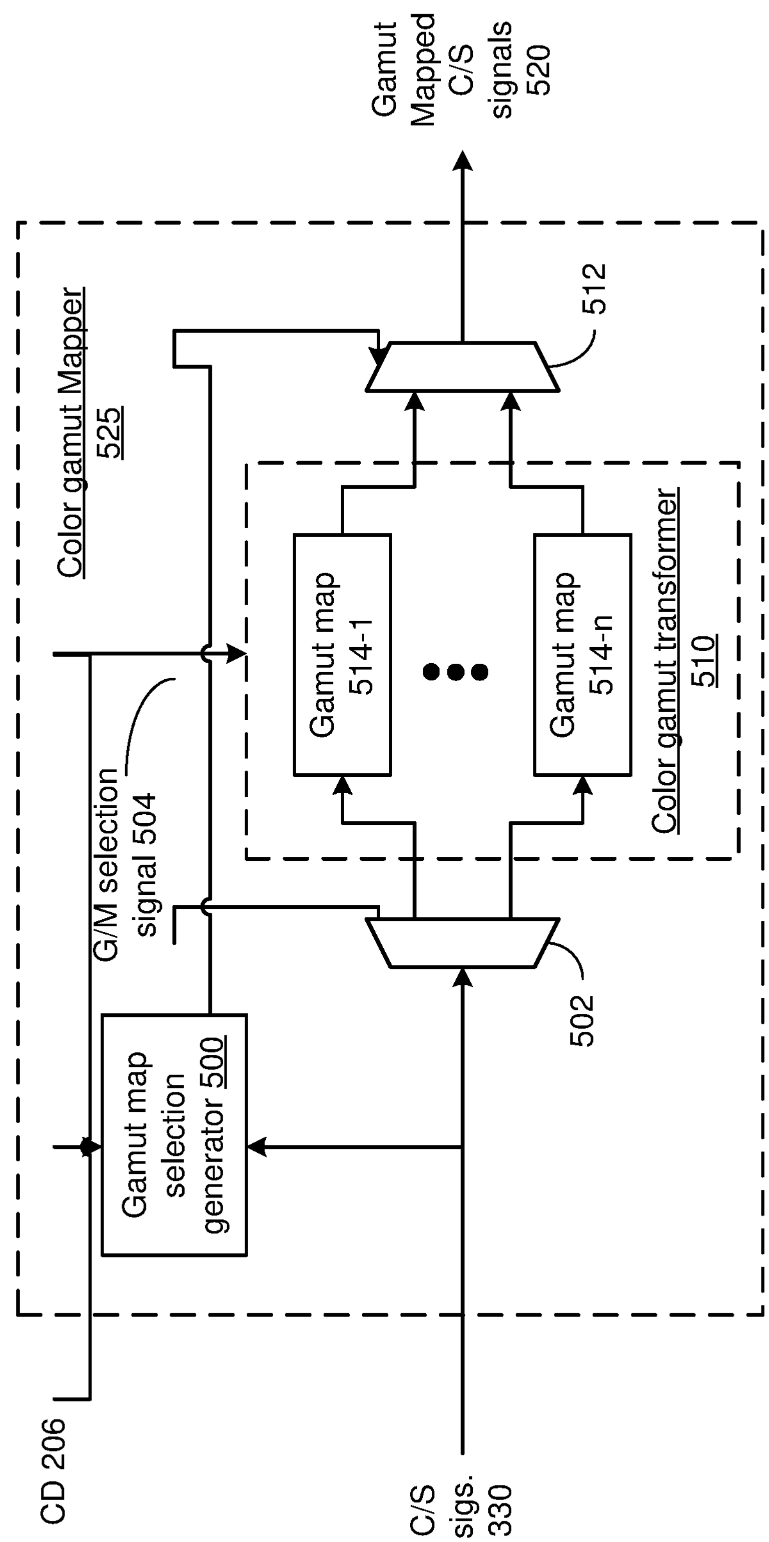
FIG. 14 presents a block diagram representation of a color gamut mapper in accordance with an embodiment of the present disclosure.

FIG. 14 presents a block diagram representation of a color gamut mapper in accordance with an embodiment of the present disclosure. In particular a color gamut mapper 525, such as gamut shaper 320, is presented for use in a dynamic range converter such as dynamic range converter 150 or other dynamic range conversion system or process.

Consider the example where the color gamut mapper 525 operates to map videos from a wider color gamut space to a narrower one. In particular, the need for color gamut mapping of video data can be caused by the proliferation of different display devices with different standards. For example, videos with original BT.2020 support may need to be displayed on a BT.709 capable device. In this case, a gamut mapping algorithm is required to map the out of gamut colors into the color gamut of the output device. The transformation from a wider color gamut space to a small one can lead to color distortion due to the out of gamut values. A desirable gamut mapping provides visual approximations of the original colors while preserving the overall color qualities.

Among different existing approaches, linear gamut mapping is relatively straightforward. It performs a linear color gamut compression toward the white point $$r' = f(c_{sr}) = a_f \cdot (S(r) - y) + b$$

$$g' = f(c_{sg}) = a_f \cdot (S(g) - y) + b$$

$$b' = f(c_{sb}) = a_f \cdot (S(b) - y) + b \qquad (1)$$

where (r, g, b) is the tri-stimulus values of a frame pixel (p) corresponding to the color space signals 330; y is the luminance value of pixel; S(·) represents the transformation operation from the input RGB space to the output RGB space (e.g. from BT. 2020 to BT. 709); ($C_{sr}$, $c_{sg}$, $c_{sb}$) denote the differences between the transformed tri-stimulus values and the luminance; ƒ(·) indicates a linear mapping function; $a_f$ is the compression slope of the mapping; b is equal to the luminance (b=y). This mapping method has the advantage of an easy implementation while preserving the luminance contrast. However, linear compression reduces chromatic contrast. The implication of this is that chromatic features close to white point might be washed out.

In various embodiments, the color gamut mapper 525 operates based on partitions of the input gamut space into non-overlapping segments. For each segment, a matching one of the gamut maps (514-1 . . . 514-n) is selected and applied to clip and compress the input video data into the output color gamut for display, transmission or other processing. In particular, the color gamut mapper 525 includes a gamut map selection generator 500 configured to analyze color space signals 330 and generate a gamut map selection signal 504 in response thereto. The color gamut transformer 510 is configured to process the color space signals 330 via a selected one of a plurality of gamut maps (514-1 . . . 514-n) to generate gamut mapped color space signals 520. For example, the plurality of gamut maps (514-1 . . . 514-n) can have differing compression slopes or otherwise different mapping functions that correspond to a piecewise linear transformation of the entire input color gamut to a reduced color gamut of the output. In the embodiment show, the selected one of the plurality of gamut maps (514-1 . . . 514-n) is selected via demultiplexer 502 and multiplexer 512 in response to the gamut map selection signal 504.

In various embodiments, the gamut map selection generator 500 operates on a pixel-by-pixel basis, analyzing the color space signals for an individual pixel of a video picture to generate the gamut map selection signal 504 for each individual pixel. Similarly, the color gamut transformer operates on a pixel-by-pixel basis to process the color space signals 330 for each individual pixel via the selected one of a plurality of gamut maps (514-1 . . . 514-n). In particular, the gamut map selection generator 500 can analyze the color space signals 330 for the individual pixel to determine one of a plurality of color space regions corresponding to the individual pixel. The gamut map selection signal 504 can be generated based on the corresponding one of the plurality of color space regions.

In various embodiments, the gamut map selection generator 500 analyzes the color space signals 330 by transforming the color space signals 330 into an alternative color domain. In this instance, the plurality of color space regions correspond to regions of the alternative color domain. In a particular example, the plurality of color space regions include:

- a first color space region about a white point that is smaller than an output gamut of the gamut mapped color space signals.
- a second color space region, sized to the output gamut, that excludes the first color space region; and
- a third color space region that is outside the second color space region.

Figure 15:
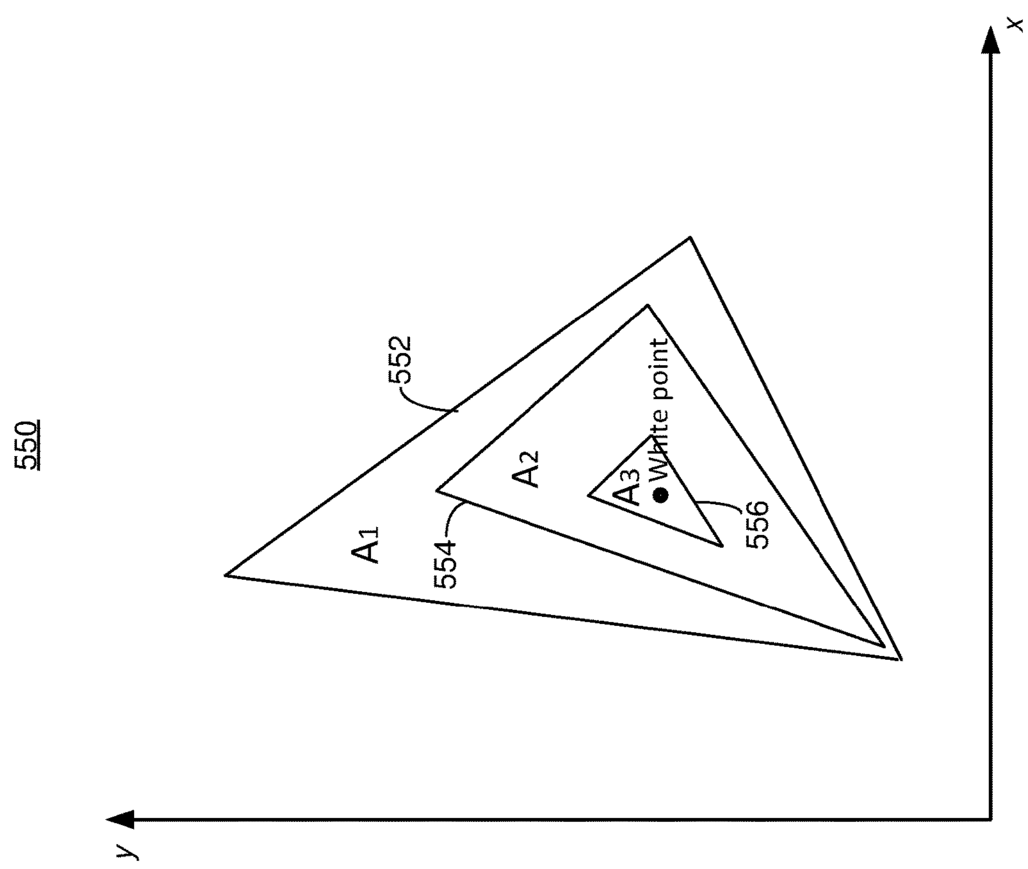
FIG. 15 presents a graphical diagram representation of a plurality of color space regions in accordance with an embodiment of the present disclosure.

FIG. 15 presents a graphical diagram representation 550 of a plurality of color space regions in accordance with an embodiment of the present disclosure. In particular, an example set of three nested color regions are shown in an (x, y) color domain that are defined by three nested boundaries that correspond to, the input gamut boundary (represented by the outer boundary 552 of region A1), the output gamut boundary (represented by the outer boundary 554 of region A2), and a boundary more closely around the white point (represented by the outer boundary 556 of region A3). The three regions can be described as follows:

- A3 is the region within output gamut boundary 554 in an area is close to white point and with low end chromatic contrast.
- A2 is the region within the output gamut boundary 554, but excluding A3; and
- A1 is the region outside of output gamut boundary 554 (excluding both A2 and A3), but within the input gamut boundary 552.

The boundary 556 of A3 can be generated by shrinking the shape of the output gamut boundary 554 by a shrunk ratio (β), chosen as a perceptual trade-off selected by observation experiments based on visual color feeling of testers.

Returning back to FIG. 14, the gamut map selection generator 500 can operate, for an input pixel (p), by converting its RGB values (r, g, b) to chromatic values (x, y) in a transformed color gamut space (e.g. an alternative color domain such as CIE xyY or other color domain). Consider L(x, y) to be category label identifying the corresponding region to which (x, y) belongs to:

$$L(x, y) = \begin{cases} 1 & (x, y) \in A_1 \\ 2 & (x, y) \in A_2 \\ 3 & (x, y) \in A_3 \end{cases} \tag{2}$$

where $$(x, y)=T(r, g, b) \tag{3}$$

and T(·) represents the related intermedia color space transform. Therefore, the gamut map selection generator 500 can label each pixel in a video frame, into one of the segment categories (1, 2, 3) according to its (r, g, b). For pixels with their (r, g, b) labeled in one of segment categories, a specific gamut map (514-1 . . . 514-3) with a specific matching function is applied to reproduce the input colors. The gamut map selection signal 504 is generated to select the specific gamut map (514-1 . . . 514-3) with the specific matching function to be applied based on the segment category of that pixel.

With segment categories (1, 2, 3), a piecewise matching function can be designed as:

$$r' = f(c'_{sr}) = \begin{cases} a_{f1} \cdot c'_{sr} + y & \text{if } L(T(r, g, b)) == 1 \\ a_{f2} \cdot c'_{sr} + y & \text{if } L(T(r, g, b)) == 2 \\ a_{f3} \cdot c'_{sr} + y & \text{if } L(T(r, g, b)) == 3 \end{cases} \tag{4}$$

where $c'_{sr}$ is defined as $c'_{sr}$=Clip(S(r))−y . Clip(·) is a clipping function to restrict value within the allowable range. It is noticeable that, for L equal to 2 and 3, $c'_{sr}=c_{sr}$=S(r)−y.

Without a loss of generality, the same matching process as (4) can be applied separately to each of the three color values ($c'_{sr}$, $c'_{sg}$, $c'_{sb}$). AS previously discussed, the values of the values of $\alpha_{f1}$, $\alpha_{f2}$ and $\alpha_{f3}$ can correspond to differing compression slopes. Further, the compression slope $\alpha_{f1}$ can be selected to compress the clipped out of gamut values for avoiding visible clipping artifacts. The slope $\alpha_{f2}$ can be selected to compress the within destination gamut values for preserving overall perceptual color characteristics of the original video. The slope $\alpha_{f3}$ can be selected to keep the low end color contrasts with small compression or no compression ($\alpha_{f3}$=1). In various embodiments, the values of $\alpha_{f1}$ , $\alpha_{f2}$ and $\alpha_{f3}$ can be determined heuristically or based on observation experiments according to the perceptual color feeling of testers.

As shown, the gamut map selection generator 500 and color gamut transformer 510 are responsive to the configuration data 206. In the fashion, input and output gamuts, color space domains and color space formats, region segmentations, the number of separate gamut maps, compression slopes and other parameters can be adaptively configured for use in differing color space processes.

Figure 16:
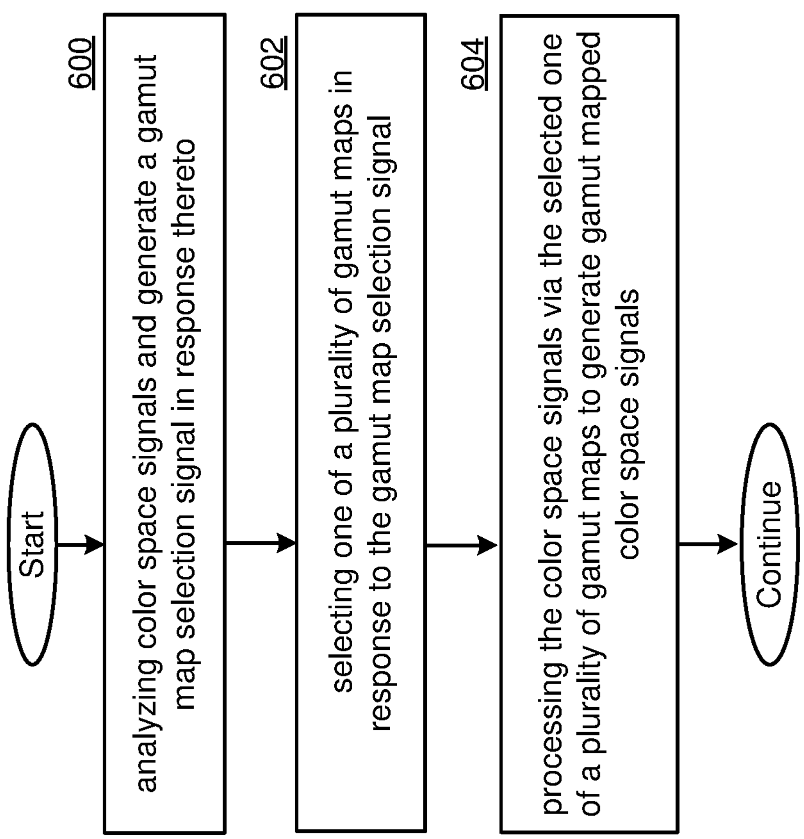
FIG. 16 presents a flowchart representation of a method in accordance with an embodiment of the present disclosure.

FIG. 16 presents a flowchart representation of a method in accordance with an embodiment of the present disclosure. In particular, a method is presented for use with one or more functions and features described in conjunction with FIGS. 1-15. Step 600 includes analyzing color space signals and generating a gamut map selection signal in response thereto. Step 602 includes selecting one of a plurality of gamut maps in response to the gamut map selection signal. Step 604 includes processing the color space signals via the selected one of a plurality of gamut maps to generate gamut mapped color space signals.

In various embodiments, step 600 includes analyzing the color space signals for an individual pixel of a video picture to generate the gamut map selection signal for the individual pixel and step 604 includes processing the color space signals for the individual pixel via the selected one of a plurality of gamut maps. Step 600 can include analyzing the color space signals for the individual pixel to determine one of a plurality of color space regions corresponding to the individual pixel and further generating the gamut map selection signal based on the one of the plurality of color space regions. Step 600 can include transforming the color space signals into an alternative color domain, and wherein the plurality of color space regions correspond to the alternative color domain.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A reconfigurable dynamic range converter comprising:

a color space converter to receive a source video and convert source color space signals of the source video to non-linear color space signals;

a reconfigurable linearizer to receive configuration data and convert the non-linear color space signals to linearized color space signals, the reconfigurable linearizer including at least one reconfigurable look-up table used for converting the non-linear color space signal that is reconfigured based on the configuration data for a particular conversion process identified in the configuration data; and a reconfigurable color volume transformer to receive the configuration data, dynamic color transform metadata and the linearized color space signals and generate adjusted linearized color space signals based on the dynamic color transform metadata, the reconfigurable color volume transformer including a reconfigurable tone mapper, the reconfigurable tone mapper having at least one reconfigurable look-up table, wherein the at least one reconfigurable look-up table of the tone mapper is reconfigured based on the configuration data for the particular conversion process.

2. The reconfigurable dynamic range converter of claim 1, wherein the color space converter is a first color space converter, the reconfigurable dynamic range converter further comprising:

a reconfigurable delinearizer to receive the configuration data and convert the adjusted linearized color space signals to non-linearized color space signals, the reconfigurable delinearizer including at least one reconfigurable look-up table used for converting the linearized color space signals that is reconfigured based on the configuration data for the particular conversion process identified in the configuration data; and a second color space converter to convert the non-linearized color space signals to display domain signals.

3. The reconfigurable dynamic range converter of claim 1, wherein the reconfigurable color volume transformer further includes a gamut shaper to generate gamut shaped linearized color space signals, and wherein the tone mapper generates chrominance mapped components based on the gamut shaped linearized color space signals.

4. The reconfigurable dynamic range converter of claim 1, wherein the reconfigurable tone mapper has at least two reconfigurable look-up tables.

5. The reconfigurable dynamic range converter of claim 4, wherein the reconfigurable tone mapper further includes a weighting module, a mode select, a transfer function interpolator and adders.

6. The reconfigurable dynamic range converter of claim 1, wherein the reconfigurable tone mapper is a luminance tone mapper.

7. The reconfigurable dynamic range converter of claim 1, wherein the reconfigurable tone mapper is a chrominance tone mapper.

8. The reconfigurable dynamic range converter of claim 1, wherein the color volume transformer includes one or more memories to store the configuration data.

9. The reconfigurable dynamic range converter of claim 1, wherein the reconfigurable tone mapper is set in a scale mode or a translate mode based on the configuration data or the dynamic color transform metadata.

10. The reconfigurable dynamic range converter of claim 1, wherein the reconfigurable look-up table of the linearizer and the reconfigurable look-up table of the tone mapper are reconfigured when new configuration data is received that indicates a different conversion process for a video signal.

11. The method of claim 1, further comprising storing the configuration data in one or more memories of the reconfigurable color volume transformer.

12. The method of claim 1, further comprising setting the tone mapper in a scale mode or a translate mode based on the configuration data or the dynamic color transform metadata.

13. The method of claim 1, further comprising:

receiving a new video signal having new configuration data, the new configuration data indicating a different conversion process;

reconfiguring the look-up table of the reconfigurable linearizer based on the new configuration data;

reconfiguring the look-up table of the tone mapper of the reconfigurable color volume transformer based on the new configuration data.

14. A method for reconfiguring a dynamic range converter based on configuration data, comprising:

receiving a video signal having the configuration data and dynamic color transform metadata related to the video signal, the configuration data indicating a particular conversion process;

converting source color space signals of the video signal to non-linear color space signals;

reconfiguring a look-up table of a reconfigurable linearizer based on the configuration data;converting the non-linear color space signals to linearized color space signals based on the look-up table of the reconfigurable linearizer; reconfiguring a look-up table of a tone mapper of a reconfigurable color volume transformer based on the configuration data; and generating adjusted linearized color space signals based on the dynamic color transform metadata and the reconfigured look-up table of the tone mapper.

15. The method of claim 14, further comprising:

converting the adjusted linearized color space signals to non-linearized color space signals; and converting the non-linearized color space signals to display domain signals.

16. The method of claim 14, further comprising generating gamut shaped linearized color space signals, and generating chrominance mapped components based on the gamut shaped linearized color space signals.

17. The method of claim 14, wherein the look-up table of the tone mapper is a first look-up table, the method further comprising:

reconfiguring a second look-up table of the tone mapper based on the configuration data.

18. The method of claim 17, wherein the reconfigurable tone mapper further includes a weighting module, a mode select, a transfer function interpolator and adders.

19. The method of claim 14, wherein the tone mapper is a luminance tone mapper.

20. The method of claim 14, wherein the tone mapper is a chrominance tone mapper.

* * * * *